Oct. 9, 1923.
C. SCHENCK
METAL WHEEL
Original Filed Nov. 28, 1919
1,469,964
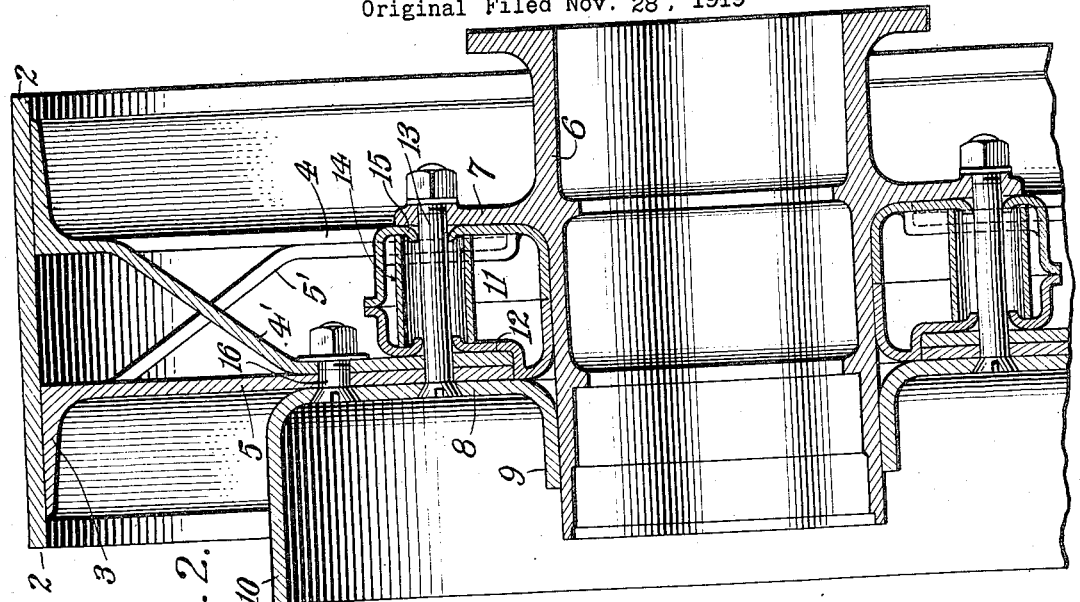
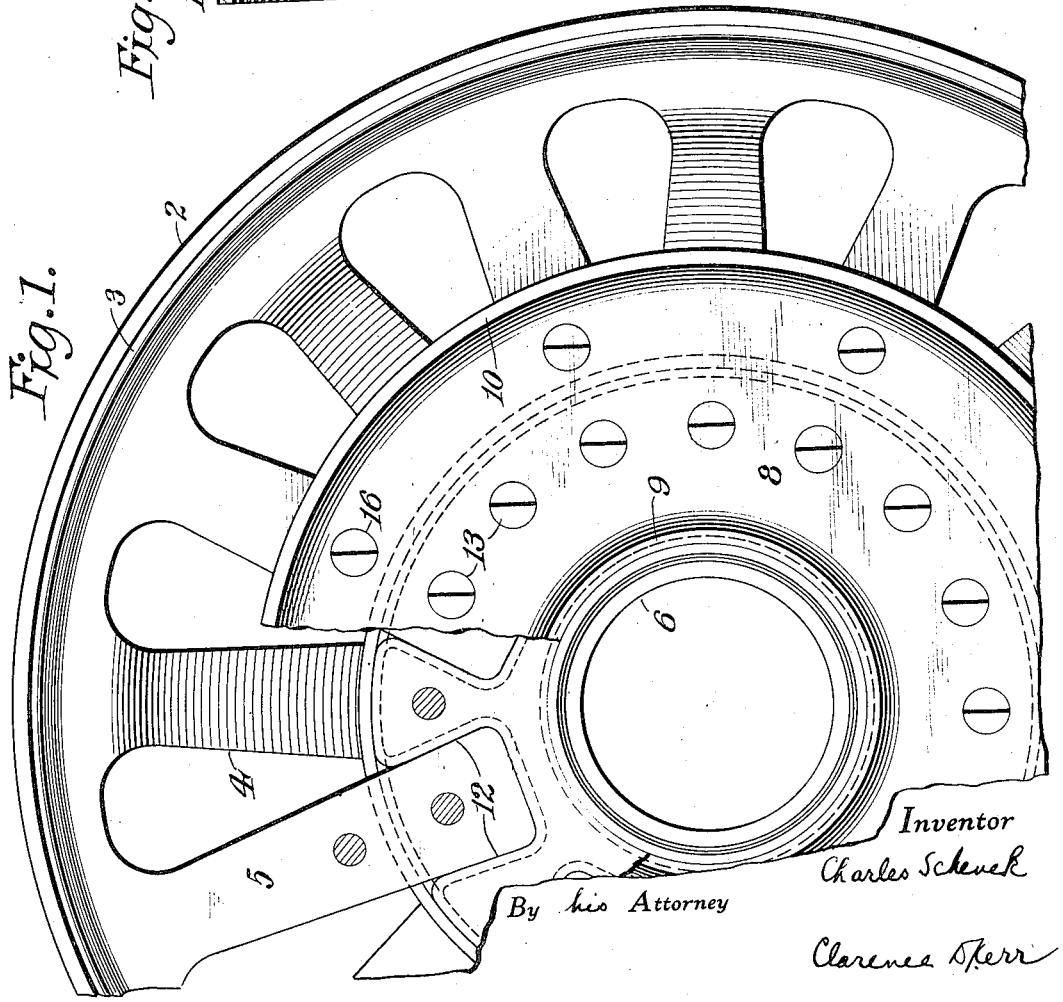
Inventor
Charles Schenck
By his Attorney
Clarence Sperr Patented Oct. 9, 1923.

1,469,964

UNITED STATES PATENT OFFICE.

CHARLES SCHENCK, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

METAL WHEEL.

Application filed November 26, 1919, Serial No. 341,063. Renewed March 7, 1923.

*To all whom it may concern:*

Be it known that I, CHARLES SCHENCK, a citizen of the United States, residing at Bethlehem, Northampton County, Pennsylvania, have invented new and useful Improvements in Metal Wheels, of which the following is a specification, reference being had to the accompanying drawings, in which—

Fig. 1 is an elevation of a metal wheel embodying my invention and Fig. 2 is a section thereof.

My invention relates to metal wheels made of flanged metal bars or beams, in which reinforced peripheral portions and spokes are formed, respectively, from the flanges and webs of the bars or beams. My invention comprises the use of a plurality of such bars or beams, so as to provide a wheel suitable for extra heavy service, and in the means by which the inwardly extending spoke portions are secured to the hub. My invention also consists in the construction and arrangement of parts which I shall hereinafter describe and claim.

Referring to the drawings, the body of the wheel is comprised of flanged portions 3, 3' of metal beams or bars, of which I have shown two, bent to circular form. The rim 2 of the wheel is preferably comprised of a flat piece of steel bent in a circle (with the ends butt welded) and secured upon the exterior of the flanged portions 3, 3' of the beams or bars by any suitable means, such as spot welding. The webs of the beams or bars are cut to form spoke portions 4, 4', 5, and 5', extending inwardly from the flanged portions, and each alternate spoke 4' is bent to bear against an unbent spoke 5 of the opposing beam, and vice versa, so that two double sets of spokes are thereby formed.

The hub comprises the main or interior hub member 6, which has an exterior annular projection 7 and a supplementary or exterior member 8, in parallel spaced relation to the projection 7. The exterior member 8 has a flange 9 engaging the periphery of the interior member 6. The exterior member 8 may also be provided with a surface 10 to serve as a brake drum.

The unbent spokes 4 of the bar 3 bear against the inner face of the projection 7 and the unbent spokes 5 of the bar 3' bear against the inner face of the exterior member 8, while the alternately bent spokes 4' and 5' bear against the inner faces of the unbent spokes 4 and 5 of the opposing beam. Between the projection 7 and the exterior member 8 is arranged a spacer 11, which is provided with pockets 12 in the side faces thereof to receive the ends of the spokes. Each pocket is of sufficient depth to accommodate two spokes. The projection 7, exterior member 8, spokes and spacer are suitably apertured for the reception of the bolts 13, by which the parts are secured together, and the spacer 11 is sustained against collapse by the bolt sleeves 14, which are held in place by the inturned edges 15 of the spacer. As an additional securing means between the exterior member 8 and the adjacent spokes 5 the bolts 16 are provided. Other securing means for the various parts, such as spot welding, may also be employed.

It will be seen that the wheels made in accordance with my invention provide the maximum support possible directly under the center of each tire, and the quadruple sets of spokes for each wheel serve to very greatly increase the rigidity, strength and durability of the structure.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. A metal wheel comprising two flanged bars arranged in parallel spaced relation with the flanges bent into wheel shape and the webs cut to form inwardly extending spokes, and a hub secured to the inwardly extending spoke portions.

2. A metal wheel comprising two flanged bars arranged in parallel spaced relation with the flanges bent into wheel shape and the webs cut to form inwardly extending spokes, and a hub engaging certain of the spokes of each bar out of the plane of such bar.

3. A metal wheel comprising two flanged bars arranged in parallel spaced relation with the flanges bent into wheel shape and the webs cut to form inwardly extending spokes, a rim mounted upon said flanges, a hub having projections parallel to the plane of the bars engaging certain of the spokes, and a spacer between the projections having pockets in which the hub ends of the spokes are seated.

4. A metal wheel comprising two flanged bars arranged in parallel spaced relation with the flanges bent into wheel shape and the webs cut to form inwardly extending spokes, a rim mounted upon said flanges, and a hub having projections parallel to the plane of the bars, each projection engaging the hub ends of alternate spokes of one of the bars.

5. A metal wheel comprising two flanged bars arranged in parallel spaced relation with the flanges bent into wheel shape and the webs cut to form inwardly extending spokes, a rim mounted upon said flanges, and a hub having projections parallel to the plane of the bars, each projection engaging the hub ends of alternate spokes of one of the bars, the hub ends of intermediate spokes of each one of the bars being secured against the hub ends of opposite alternate spokes of the other bar.

6. A metal wheel comprising two sets of spoke members, each set having a unitary flanged head and integral inwardly extending spokes, a rim mounted on said flanges, and a hub comprising two relatively movable portions, each engaging alternate spokes in one of said sets, and means for spacing apart the spoke members at the point at which they engage the hub.

7. A metal wheel comprising two sections, each having felloe and spoke portions, spokes of one section being intercalated with spokes of the other section, the spoke ends being secured about a spoke spacing member in the region of the hub, and means for securing the two sections together.

CHARLES SCHENCK.